United States Patent Office 3,455,679
Patented July 15, 1969

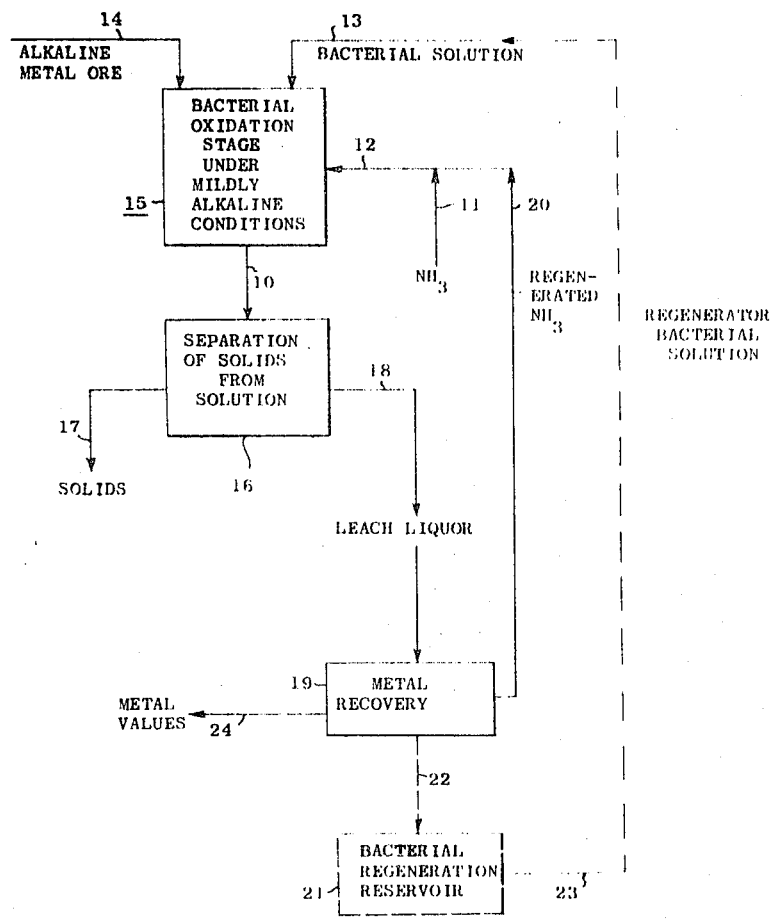

3,455,679
BACTERIAL LEACHING OF ORES WITH AN ALKALINE MATRIX
Albert A. Mayling, North Vancouver, British Columbia, Canada, assignor to Roan Selection Limited, Vancouver, British Columbia, Canada
Filed Feb. 28, 1967, Ser. No. 619,455
Claims priority, application Canada, Feb. 1, 1967, 981,749
Int. Cl. C22b 3/00
U.S. Cl. 75—101                                15 Claims

ABSTRACT OF THE DISCLOSURE

Ores of an alkaline nature are leached by bacterial action for the recovery of metal values. The tendency for the broken pieces of alkaline ores to cement together is overcome by the use of a mildly alkaline aqueous solution containing mobile, non-spore forming, oxidizing, autotrophic, rod bacteria. Some examples are *Thiobacillus thiooxidans, Thiobacillus thioparus,* and *Thiobacillus thioparus* (ATCC No. 8158). A pH of 7.1 to 9 is preferred.

---

This invention relates to hydrometallurgical processes for extracting metals from ores in which they are present. It is concerned more particularly with a novel procedure for leaching certain sulfide ores.

Processes for bacterial leaching of certain sulfide ores are now known. (See, U.S. Patent No. 2,829,964 issued Apr. 8, 1958 to Stuart R. Zimmerley et al.). In the process of the above identified U.S. patent, a lixiviant is used in the sulfide mineral leaching stage, which is a ferric sulfate sulfuric acid solution carrying cultures of suitably tolerant, iron oxidizing autotrophic bacteria.

However, the procedures known heretofore have not been applied to the leaching of ores containing more than 10% limestone. It was found, for example, that when an ore containing more than 10% limestone is leached bacterially with acidophilic bacteria, the broken rock appears to be cemented together by the deposited calcium sulfate, and that leaching slows to an extremely slow rate. There are large deposits of low grade ore of an essentially alkaline nature, and this represents significant tonnages of apparently unrecoverable metal values.

An object of a broad aspect of this invention is the provision of a process for the bacterial leaching of ores of an essentially alkaline nature.

An object of another aspect of this invention is the provision of a continuous process for the bacterial leaching of, and subsequent recovering of metal values from, an ore of an essentially alkaline nature.

An object of a first specific aspect of this invention is the provision of a continuous process for the bacterial leaching of and subsequent recovery of metal values from an essentially alkaline copper sulfide ore.

An object of a second specific aspect of this invention is the provision of a continuous process for the bacterial leaching of and subsequent recovery of metal values from an essentially alkaline zinc sulfide ore.

An object of a third specific aspect of this invention is the provision of a continuous process for the bacterial leaching of and subsequent recovery of metal values from an essentially alkaline lead sulfide.

An object of a fourth specific aspect of this invention is the provision of a continuous process for the bacterial leaching of and subsequent recovery of metal values from an essentially alkaline ore containing silver.

By a broad aspect of this invention, a process is provided for leaching metal values from a sulfide ore of an essentially alkaline nature which comprises using, as the oxidizing leaching agent, an aqueous solution, mildly alkaline in pH, containing an effective quantity of mobile, non-spore forming, oxidizing, autotrophic, rod bacteria which are tolerant to the metallic constituent or constituents to be extracted. In a preferred aspect of the invention, the pH is maintained at about 7.1 to 9, generally because of the alkaline nature of the ore. In such case, the process most preferably is cyclic by means of boiling the leach liquor to recover the metal values while simultaneously forming ammonia for use in the leaching agent.

The bacteria used in the leaching process of the present invention are certain bacteria which have been found to oxidize sulfides under mildly alkaline condition. These may generically be designated mobile, non-spore forming, oxidizing, autotrophic rod bacteria. Non limiting examples include *Thiobacillus thiooxidans,* and its facultative autotroph, *Thiobacillus thioparus*. A particularly advantageous bacteria is known as *Thiobacillus thioparus* (ATCC No. 8158).

It is essential for the practice of this invention that the leach medium be mildly alkaline at the initiation of the procedure. By "mildly alkaline" is meant a pH of about 7.1 to 9. Any suitable alkaline agent may be used, for example, alkali and alkaline earth metal hydroxides. A particularly preferred alkaline agent is, however, ammonia.

The ores which may be leached by the process of this invention include any metal ore which is of an essentially alkaline nature. Non limiting examples include such copper sulfide, zinc sulfide lead sulfide and silver sulfide ores as pyrrhotite, pyrite, chalcorite, cavelline, bornite, chalcopyrite, chalcopyrhitene, pentlandite, cubanite, valerite, tennanite, tetrahedrete, argentite, polybasite, stephanite, stromeyerite, argentopyrite, smithite, mrousite, miagaryrite, pyargyrite, blende, galena, sartorite, bounanite, selymannite, etc.

The accompanying drawing is a very schematic flow sheet of one procedure following the teachings of an aspect of this invention, for effecting the bacterial leaching of one aspect of this invention.

Referring to the drawing, the bacterial oxidation stage under mildly alkaline condition is effected in a pacuhca 15, fed by means of an alkaline ore feed chute 14, a bacterial solution feed conduit 13 and an alkaline agent line 12, here shown to conduct ammonia into the pacuhca. The effluent from the pacuhca 15 flows via line 10 to a chamber 16 where solids are removed via line 17 for further processing (not shown) and where the leach liquor is withdrawn via line 18 and proceeds to a metal recovery apparatus 19. Metal values are withdrawn from effluent line 24 and regenerated ammonia is led via line 20 to pacuhca inlet line 12 for reuse.

Optionally, but desirably, the residual liquor from apparatus 19 is led to a bacterial regeneration reservoir 21 where the bacteria is revitalized. It is then conducted via line 23 to the bacterial solution inlet 13 of the pacuhca 15, for reuse.

The following are non-limiting examples of aspects of the present invention.

EXAMPLES I AND II

Two separate samples of copper sulphide ore were obtained, one from Northern Ontario and the other from British Columbia. These ores were ground up to about 80% less than 200 mesh and placed separately in glass pacuhcas of about 2" diameter and left aerating as a 20% w./v. slurry with the addition of *Thiobacillus thioparus* (ATCC #8158). The pH of the leaching agent at start-up was 8.2 for Northern Ontario ore and 8.4 for the British Columbia ore.

Samples were taken at intervals and analysed for ammonia soluble copper content, acid soluble content after ammonia leach, and copper content insoluble in ammonia and in acid. The samples taken after one month operation showed no significant ammonia soluble content. The following analytical figures were later obtained:

| Source of sample | British Columbia | Northern Ontario |
|---|---|---|
| Acid consumption (lbs. $H_2SO_4$/ton) | over 400 | 175 |
| Total copper content | 0.62 | 0.65 |
| Cu soluble in $NH_3$ | Nil | Nil |
| Cu soluble in acid | Trace | Nil |
| After 2 months aeration: | | |
| Cu soluble in $NH_3$ percent | 0.32 | 0.12 |
| Soluble in acid after $NH_3$, leach | 0.037 | 0.025 |
| Insoluble in $NH_3$ or acid | 0.25 | 0.53 |
| After 3 months aeration: | | |
| Cu soluble in $HN_3$ percent | 0.46 | 0.36 |
| Soluble in acid after $NH_3$, leach | 0.07 | 0.02 |
| Insoluble in $NH_3$ or acid | 0.09 | 0.25 |
| After 4 months aeration: | | |
| Cu soluble in $NH_3$ percent | 0.52 | 0.44 |
| Soluble in acid after $NH_3$, leach | 0.05 | 0.05 |
| Insoluble in acid or $NH_3$ | 0.05 | 0.15 |

These results show that copper values may be relatively easily recovered following bacterial oxidative leaching under mildly alkaline conditions according to the process of one aspect of this invention.

EXAMPLE III

A lead/zinc ore from Eastern Canada was oxidatively leached according to the process of another aspect of this invention under mildly alkaline conditions. The bacteria used was autotrophic bacteria found in the effluent water from the deposit, and was found to oxidize sulfur and sulfides under mildly alkaline condition. The leach medium has a pH at start-up of 8.0.

The following analytical figures were obtained from the initiator.

Ore from Eastern Canada:
- Initial Pb content _____ 4.0%.
- Oxidized Pb _____ None detected.
- Zinc _____ 8.2%.
- Oxidized Zn _____ None detected.
- Acid consumption _____ About 200 lbs. $H_2SO_4$ per ton.

The determination of acid consumption gave a doubtful figure as the ore contained some pyrrhotite which would consume added acid but would give a neutral salt [($FeSO_4$) on bacterial leaching], that would act as an acid in the presence of limestone.

The following analytical results were later obtained. After 2 weeks bacterial leach—oxidized Pb: 0.44, 3.5. Oxidized Zn: 1.55, 2.11 (after 3 weeks).

From these results, it can be seen that nearly 90% of the PbS is oxidized to $PbSO_4$ and over 25% of the ZnS content converted to an ammonia soluble zinc salt, presumably $ZnCO_3$.

The above examples clearly show that essentially alkaline sulfide ores can be converted to oxidized materials by bacterial action in a mildly alkaline medium.

Recovery of values from the oxidized ores may be by any process well known to those skilled in the art and will not be described in detail herein. For example, copper, silver and zinc can be recovered by solution in ammonia followed by boiling to recover a concentrate and recycle the ammonia. Lead can be recovered by solution in a strong brine solution or solution in diethylene triamine followed by precipitation as $PbCO_3$ with $CO_2$.

Copper may also be recovered as a metal powder by reaction with hydrogen under elevated temperature and pressure.

Procedures for the recovery of copper values are shown in U.S. Patent No. 2,829,964, issued Apr. 8, 1958, to S. R. Zimmerley et al., while procedures for the recovery of lead values are shown in U.S. Patent No. 2,950,964, issued Aug. 30, 1960, to F. A. Forward et al. Numerous other patented procedures for the recovery of metal values are known in the art, and the present invention is not to be restricted to any particular such procedure.

In practicing an aspect of the present invention in situ the recovery of values and bacterial leaching must be kept as two separate processes with adequate washing between the recovery leach procedure and bacterial oxidation since the bacteria will not tolerate strong ammonia solutions, strong brine or such chemicals as diethylene triamine. Using strong ammonia as a leach liquor in field operations presents some problems which can be solved as follows. In an underground operation, it will be necessary to form a positive barrier between recovery leaching and bacterial oxidation, while in a surface heap leach the heap will need to be enclosed in a suitable envelope that can readily be constructed with plastic sheeting.

I claim:

1. A process for leaching metal values from a sulfide ore of an essentially alkaline nature which comprises using, as the oxidizing leaching agent, an aqueous solution, mildly alkaline in pH, containing an effective quantity of mobile, non-spore forming oxidizing, autotrophic, rod bacteria which are tolerant to the metallic constituent or constituents to be extracted.

2. The process of claim 1 wherein the pH is 7.1–9.

3. The process of claim 2 wherein the pH is maintained by ammonia.

4. The process of claim 3 in continuous cyclic form including the steps of recovering metal values while boiling off ammonia for reuse in the oxidizing, leaching agent.

5. The process of claim 4 wherein the ore is a copper sulfide ore, and wherein copper values are recovered.

6. The process of claim 4 wherein the ore is a zinc sulfide ore and zinc values are recovered.

7. The process of claim 4 wherein the ore is a silver sulfide ore and silver values are recovered.

8. The process of claim 3 wherein the ore is a lead sulfide ore and wherein lead values are recovered by treating the leach liquor with diethylene triamine solution followed by passing $CO_2$ therethrough to provide lead carbonate.

9. An in situ underground process for the leaching of metal values from the subsequent recovery of metal values from a sulfide ore of an essentially alkaline nature which comprises using, as the oxidizing leaching agent, an aqueous solution, mildly alkaline in pH, containing an effective quantity of mobile, non-spore forming, oxidizing, autotrophic, rod bacteria which are tolerant to the metallic constituent or constituents to be extracted; forming a positive barrier between said bacterial oxidation situs and subsequent recovering leaching situs, and recovering metal values from the leach liquor.

10. The process of claim 9 wherein the pH is maintained at 7.1 to 9 by means of ammonia.

11. The process of claim 10 in continuous cyclic form including the steps of recovering metal values while boiling off ammonia for reuse in the oxidizing, leaching agent.

12. An in situ surface heap process for the leaching of metal values from a sulfide ore of essentially alkaline nature which comprises enclosing the heap in an envelope and using, as the oxidizing leaching agent, an aqueous solution, mildly alkaline in pH, containing an effective quantity of mobile, non-spore forming oxidizing, autotrophic, rod bacteria which are tolerant to the metallic constituent or constituents to be extracted.

13. The process of claim 12 wherein said envelope is formed of plastic sheeting.

14. The process of claim 13 wherein the pH is maintained at 7.1 to 9 by means of ammonia.

15. The process of claim 14 in continuous cyclic form including the steps of recovering metal values while boiling off ammonia for reuse in the oxidizing, leaching agent.

References Cited

UNITED STATES PATENTS

| | | | |
|---|---|---|---|
| 2,829,964 | 4/1958 | Zimmerley et al. | 75—104 |
| 3,266,889 | 8/1966 | Duncan et al. | 75—101 |
| 3,272,621 | 9/1966 | Zajic | 75—101 |
| 3,305,353 | 2/1967 | Duncan et al. | 75—101 |
| 3,347,661 | 10/1967 | Maylink | 75—101 X |

OTHER REFERENCES

Sutton et al.: "Bacteria In Mining and Metallurgy: Leaching Selected Ores and Minerals; Experiments with Thiobacillus Thiooxidans," Bureau of Mines Report of Investigations, No. 5839 (1961).

EDWARD J. MEROS, Primary Examiner

U.S. Cl. X.R.

23—71